United States Patent
Relf

[11] Patent Number: 6,029,392
[45] Date of Patent: Feb. 29, 2000

[54] ANIMAL TRAP

[76] Inventor: David H. Relf, 30 Oakley Gardens, London, SW3 5QG, United Kingdom

[21] Appl. No.: 09/202,033
[22] PCT Filed: Jun. 6, 1997
[86] PCT No.: PCT/GB97/01543
  § 371 Date: Dec. 7, 1998
  § 102(e) Date: Dec. 7, 1998
[87] PCT Pub. No.: WO97/46090
  PCT Pub. Date: Dec. 11, 1997

[30] Foreign Application Priority Data

Jun. 7, 1996 [GB] United Kingdom ............... 9611968

[51] Int. Cl.⁷ ................................. A01M 23/02
[52] U.S. Cl. ............................................ 43/61
[58] Field of Search ................... 43/60, 61, 66, 43/65, 58

[56] References Cited

U.S. PATENT DOCUMENTS

| 2,683,951 | 7/1954 | Hamaker | 43/61 |
| 5,502,918 | 4/1996 | Oviatt | 43/61 |
| 5,720,125 | 2/1998 | Oviatt | 43/61 |
| 5,943,813 | 8/1999 | Wang et al. | 43/61 |

FOREIGN PATENT DOCUMENTS

| 570460 | of 1923 | France. |
| 629229 | 2/1927 | France. |
| 1450513 | 1/1975 | France. |
| 2584571 | 7/1985 | France. |
| 87-255188 | 4/1983 | Japan. |
| 101774 | 1/1923 | Switzerland. |
| 220226 | 8/1924 | United Kingdom. |
| 335669 | 4/1930 | United Kingdom. |
| 425212 | 3/1935 | United Kingdom. |
| 2026833A | 7/1978 | United Kingdom. |
| 2116817A | 12/1982 | United Kingdom. |

*Primary Examiner*—Jack W. Lavinder
*Attorney, Agent, or Firm*—Sheridan Ross P.C.

[57] ABSTRACT

A trap for an animal having an elongate hollow body defining an elongate cavity, a closure at each end of the cavity, wherein the closures are adapted to permit entry by an animal to the cavity and to close behind the animal to prevent rearwards egress of the animal from the cavity, and an obturator which is able to move from end to end within the cavity and to restrict access by the animal to the closure remote from the point of entry of the animal.

13 Claims, 2 Drawing Sheets

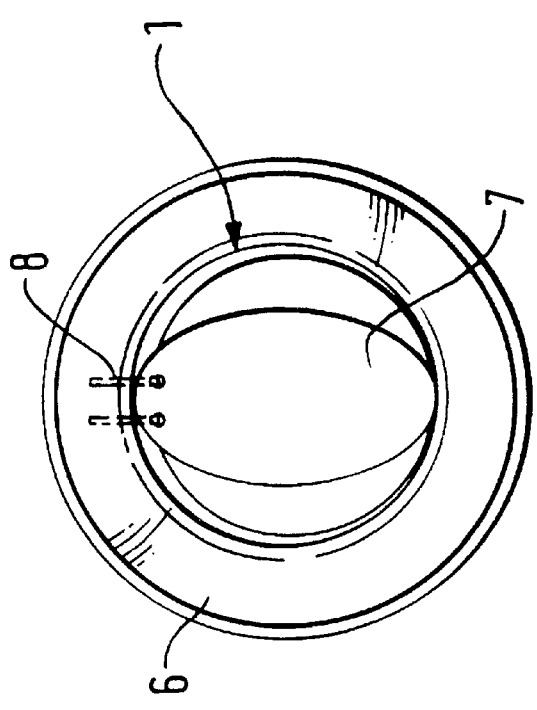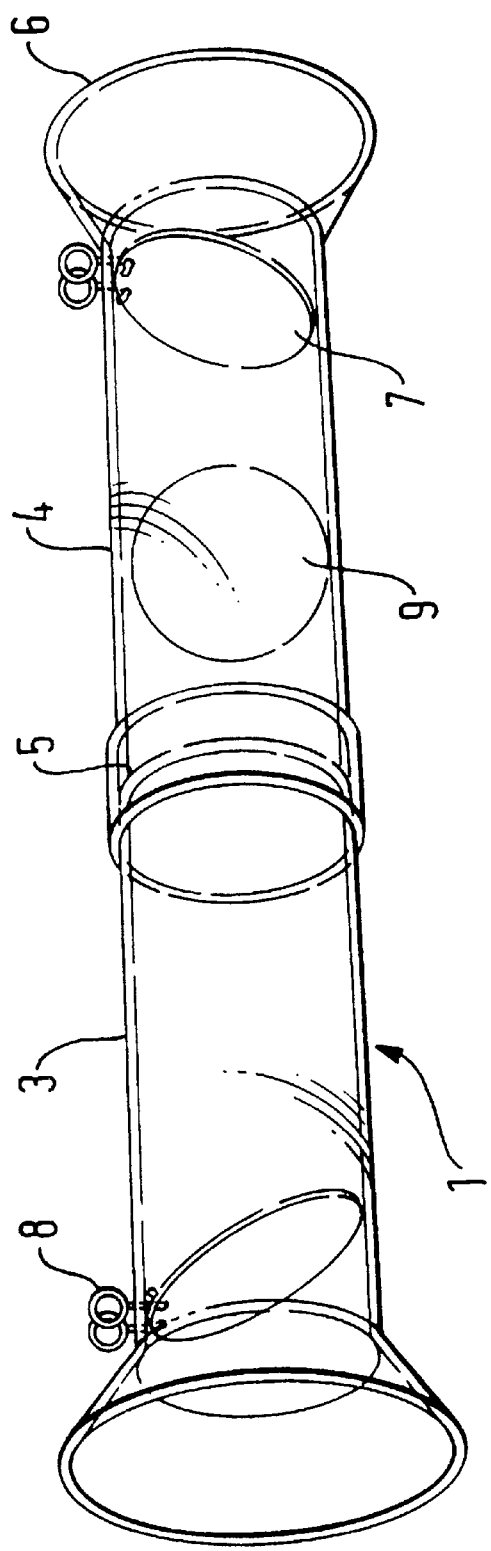

ANIMAL TRAP

The present invent ion relates to a trap for an animal, and in particular to a mole trap.

Many methods of trapping moles rely upon spring loaded devices which either crush or spear the animal. The mole is therefore either killed outright or at the very least maimed. Certain poisons, such as strychnine, may be used to kill the moles. However, these poisons often remain in the environment after the mole has been killed, and may prove fatal to other animals. In addition, the poison may remain in the dead mole's body, so that an animal which comes into contact with the poisoned mole may itself be put at risk.

More humane methods of entrapment exist, such as diverting the mole run into a pit or container. Mole runs can be extensive, however, and by their very nature are hidden from view. Diversion methods tend to be laborious to implement, therefore, and ineffective in practice. Substances exist which do not actually kill the moles but merely act as sedatives. These can affect other wild animals, however, or even domestic animals. Deterrents such as sound waves, smoke emission and smells have also been used, but while these may work in the short term, they have little lasting effect and the moles soon return.

GB-A-2026833 discloses a trap with an upper bait chamber and a lower trap chamber to trap an animal attracted into the upper chamber by the bait.

JP-B-62037943 discloses a trap formed of a clear or semi-clear polymer, having holes in the side to allow earthworms to enter into the trap.

GB 220226 describes a humane mole trap consisting of a tubular body with a one way trap door at one end and a detachable cone ending in an aperture of reduced diameter at the other. A mole encountering the trap in a mole run can therefore enter the trap by pushing against the outside of the trap door, but cannot escape from the trap once the trap door has fallen down behind it. The mole cannot leave the trap by the other end, due to the reduced diameter of the cone aperture, nor can it turn round inside the trap in order to attack the trap door with its front paws. The trap door has a "V"-shaped cut-away at its lower edge, so that if a mole which has partially opened the trap door attempts to back out of the trap, the cut-away will trap the mole's neck and prevent it from escaping. Removal of the detachable cone allows access to the trap, thereby enabling a trapped mole to be freed.

Traps such as that disclosed in GB 220226 have certain disadvantages, however. If a mole approaches the buried trap from the closed end, it will often be sufficiently powerful to push the trap out of the ground. It is therefore necessary to bury two of the traps end-to-end in a run, so that the mole will encounter an open end on approaching from either direction. Due to the length of the average mole and the length of the detachable cone, however, the total length of two traps (and therefore the length of mole run which must be exposed) would have to be somewhere in the region of 40 to 50 cm. It is not only difficult to locate a straight section of mole run of this length, but exposing the section involves too much ground disturbance, which should be minimal for successful mole trapping.

One solution is to use a double-ended trap, since this enables a single trap (which is shorter than two single-ended traps) to be incorporated into an animal run (for example a mole run), thereby minimising ground disturbance.

GB 335669 discloses a double-ended trap with sprung doors at each end, which are closed by a trip device when the animal enters the trap. A similar device is shown in GB 425212, in which the sprung doors close when the animal treads on a platform inside the trap, and in GB-A-2116817, in which the doors close by gravity when the animal treads on a pivoted platform.

Other double-ended traps are shown in GB 1450513, which is formed from a grill to allow surrounding earth to penetrate the trap; FR 2584571, in which the trap can be broken in half to allow access to the inside of the trap; FR 629229, in which the trap is separated into two by an internal barrier; and CH 101774, in which the trap has slots in its walls to enable the user to see when an animal is trapped.

The disadvantage of double-ended traps is that a mole which is trapped in one may be able to force its front paws, jaws or head behind the flap which it is facing, and thereby open the flap inwardly and escape.

According to the present invention, there is provided a trap for an animal, comprising an elongate hollow body defining an elongate cavity, a closure at each end of the cavity, wherein the said closures are adapted to permit entry by an animal to the cavity and to close behind the animal to prevent rearwards egress of the animal from the cavity, and an obturator which is able to move from end to end within the cavity and to restrict access by the animal to the said closure remote from the point of entry of the animal.

In an alternative embodiment, there is provided a trap for an animal, comprising an elongate hollow body defining an elongate cavity, a closure at each end of the cavity, wherein the said closures are adapted to permit access by an animal to the cavity but not to permit opening of the closures by the animal from within the cavity, and an obturator which is able to move from end to end within the cavity and which is adapted to restrict access to the said closures by the animal from inside the cavity.

Preferably, the obturator is substantially spherical and has a diameter such that it can roll freely inside the cavity. For example, when the body is circular in cross-section, the obturator has a diameter slightly less than that of the body. Most preferably, the obturator is a ball, which may be formed of a substantially clear material, such as the same clear plastic which forms the trap body. Alternatively, the obturator may be a rubber ball. The ball may either be solid or hollow, as long as it is light enough to be moved by the animal to be trapped.

The trap functions as follows. A mole entering either end of the trap pushes against the ball and rolls it forward towards the other end of the trap. The mole cannot get round the ball in order to gain access to the flap which is behind the ball, since the ball merely turns. Neither can the mole turn round inside the tube in order to attack the other flap.

In one embodiment, the obturator has a nib or ledge, which prevents the obturator from rolling to one end of the trap, if the trap is placed on an incline. The obturator may thereby be positioned centrally, in order that either flap can open freely. Alternatively, the obturator may be prevented from rolling to one end of the trap by an elongate element (e.g. piece of straw) inserted through a small hole in the central portion of the trap, as referred to below.

In a preferred embodiment, the closures are located at either end of the body. The trap may have a flared section extending outwardly from at least one end of the body, in which case the closure at that end is preferably located where the flared section is at its narrowest.

The body is preferably formed of two sections which are detachably connected so as to allow access to the said cavity on disconnection of the said sections. This may be achieved by providing an external sleeve for connecting the said two sections. The sleeve is preferably fixed to only one of the sections, so that the other section can simply be removed from the sleeve in order to disconnect the sections.

Accordingly, the trap can be broken in two in order to check whether a mole has been caught or to release a trapped mole. The tubular body may be formed from a substantially clear material, for example a clear plastic such as an acrylic, so that the user can check whether a mole has been caught without removing the trap from the run. The trap can easily be reconnected by inserting the sleeveless section into the sleeve.

Alternatively, the trap may be provided with a small hole in its central portion, through which an elongate element such as a stick or piece of straw may be inserted. In use, the trap is buried leaving one end of the straw (for example) above ground level. When an animal is caught in the trap, it pushes against the straw, and the portion of the straw which above ground level moves, thereby alerting the user to the presence of the mole.

The body of the trap is preferably substantially circular in cross-section.

In a preferred embodiment, the closures are hinged flaps. It is particularly preferred that the flaps close only under the action of gravity, thereby reducing the need for complicated and relatively expensive triggered sprung locking devices. However, it will be appreciated than any suitable one-way closing mechanism can be used.

The closures may be substantially circular with a diameter slightly smaller than that of the body, in which case each closure is hung with a gap between its top edge and the top wall of the trap, such that the bottom edge of each closure rests against the bottom wall of the body, thereby enabling the closure to open inwardly without having to provide a projection or catch to prevent outward opening. Alternatively, the closures may be ellipsoid in shape, with the major axis of the ellipse being longer and the minor axis being shorter than the internal diameter of the trap.

Each closure may have a "V"-shaped cut-away at its lower edge, as in GB 220226.

It is thought that moles are more likely to enter traps which are formed from wood or metal, rather than plastic. Accordingly, in a preferred embodiment, the trap is formed from wood or metal.

Particular embodiments of the present invention will now be described, with reference to the accompanying drawings, in which:

FIG. 2 is a perspective view of the trap of FIG. 1; and

FIG. 3 is an end elevation of the trap shown in FIG. 1.

Figure 1:
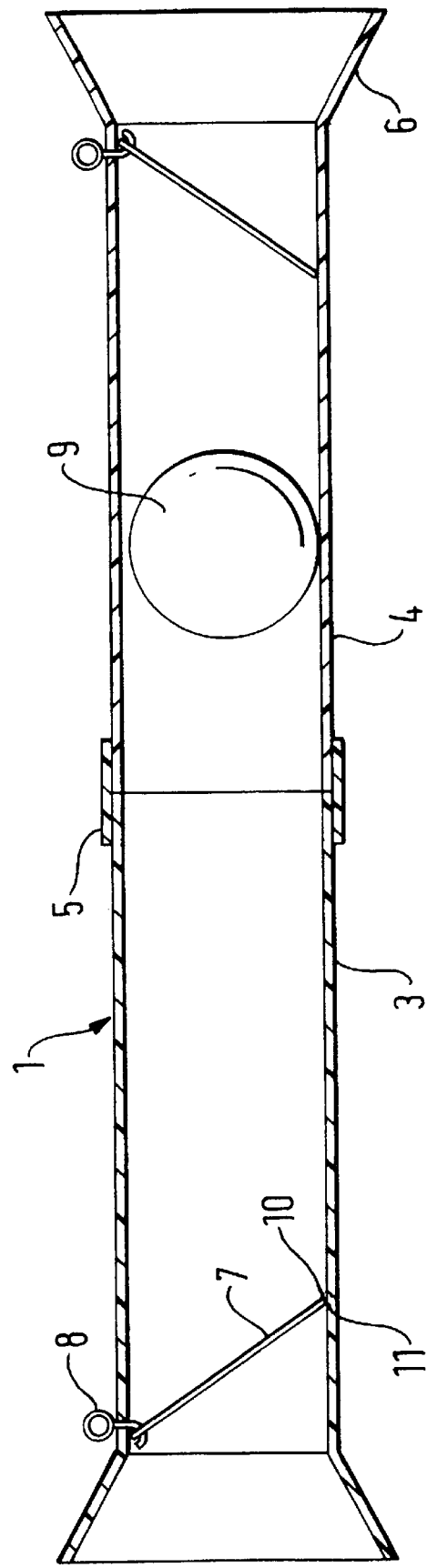
FIG. 1 is a section through a trap in accordance with the invention.

Referring to the Figures, the trap has a cylindrical body 1 of diameter 35 mm formed from two substantially identical sections 3 and 4 made from a clear acrylic. Acrylic sleeve 5 which is 20 mm long and has a diameter slightly greater than that of sections 3 and 4, is bonded to one end of section 3. Sleeve 5 extends axially outwardly from the end of section 3, thereby creating a compression joint to enable sections 3 and 4 to be joined simply by inserting one end of section 4 into sleeve 5 until sections 3 and 4 abut.

Conically flared section 6 extends outwardly from either end of body 1 to a maximum diameter of 60 mm, thereby creating a funnelled mouth on either end of the trap. The flared section is formed of the same acrylic material as sections 3 and 4.

Two gravity flaps 7, which are ellipsoid-shaped aluminium discs with a major axis of 40 mm, hang from body 1 where flared section 6 meets section 3 or 4. Flaps 7 are attached by wire hinge 8 (formed from 2 mm diameter wire) by means of two holes punched in each flap 7 and two corresponding holes bored in body 1 at each end.

Since each flap 7 has a major axis which is longer than the diameter of body 1, lower edge 10 of each flap 7 rests against the inner surface of body 1 at abutment point 11, so that flap 7 is angled inwardly and can be opened inwardly but not outwardly.

Ball 9, which is formed from the same clear acrylic material as body 1, is contained within body 1 between the two flaps 7. Ball 9 has a diameter of 33 mm, so that it can roll freely up and down body 1 between the two flaps 7. Ball 9 can be removed from body 1 by disconnecting the sections 3 and 4 as described above.

In use, the trap is assembled by placing ball 9 inside either of sections 3 or 4, and then connecting sections 3 and 4 by inserting section 4 into the sleeve 5. The two wire hinges 8 are aligned by rotating sections 3 and 4 relative to each other. A section of mole run is exposed, and the trap is laid in the run horizontally with wire hinges 8 uppermost so that each flap 7 hangs with lower edge 10 resting against abutment point 11 as described above. The earth is then be replaced on top of the trap, and a marker, for example a stick or a flag, is placed on the spot where the trap has been buried so that the trap can be located later.

A mole making its way along the run will encounter the trap at either of flared sections 6. These act to guide the mole into the trap, where it encounters flap 7. Flap 7 opens inwardly as the mole pushes against it, and allows the mole to pass into body 1, flap 7 falling shut behind the mole. Because aluminium is a relatively light material, very little pressure is needed to lift flap 7.

The mole then makes it way along the inside of body 1 until it encounters ball 9. If the mole tries to back out of the trap it is prevented from doing so by flap 7, since flap 7 cannot open outwardly. If the mole makes it way forwards, it rolls ball 9 towards the other end of the trap until ball 9 reaches flap 7. Any pressure applied by the mole to ball 9 simply causes ball 9 to rotate, and the mole is prevented from gaining access to flap 7 with its front paws, jaws or head.

Because body 1 is made from a clear material, the user can easily check whether a mole has been caught in the trap, and remove the trap from the run in order to free the mole by disconnecting sections 3 and 4. The mole can then be disposed of according to the user's preference.

I claim:

1. A trap for an animal, comprising an elongate hollow body defining an elongate cavity, a closure at each end of the cavity, wherein the said closures are adapted to permit entry by an animal to the cavity and to close behind the animal to prevent rearwards egress of the animal from the cavity, and an obturator which is able to move from end to end within the cavity and to restrict access by the animal to the said closure remote from the point of entry of the animal.

2. A trap as claimed in claim 1, wherein the obturator is substantially spherical.

3. A trap as claimed in claim 1, wherein the obturator is formed of a substantially clear material.

4. A trap as claimed in claim 1, wherein the body is formed of two sections which are reversibly connected so as to allow access to the said cavity on disconnection of the said sections.

5. A trap as claimed in claim 4, wherein the body additionally comprises an external sleeve for connecting the said two sections.

6. A trap as claimed in claim 5, wherein the sleeve is fixed to only one of the said two sections.

7. A trap as claimed in claim 1, having a flared section extending outwardly from at least one end of the body.

8. A trap as claimed in claim 1, wherein the body is formed of a substantially clear material.

9. A trap as claimed in claim 1, wherein the body is substantially circular in cross-section.

10. A trap as claimed in claim 1, wherein the closures are hinged flaps.

11. A trap as claimed in claim 10, wherein the flaps are hingedly mounted to hinge into the cavity.

12. A trap as claimed in claim 1, wherein the closures are gravity flaps.

13. A trap as claimed in claim 1, additionally comprising means defining a hole in the body of the trap and an elongate indicator element for inserting in the hole such that a first section of the indicator element is inside the said cavity and a second section of the indicator element is outside the said cavity, whereby movement of an animal in the said cavity causes movement of the indicator element in order to alert the trap user to the presence of the animal.

* * * * *